United States Patent
Bonde et al.

(10) Patent No.: US 11,956,676 B2
(45) Date of Patent: Apr. 9, 2024

(54) DYNAMIC TRANSMISSION RATES FOR ISOCHRONOUS STREAMING

(71) Applicant: Bose Corporation, Framingham, MA (US)

(72) Inventors: Casper Stork Bonde, Støvring (DK); Rasmus Abildgren, Skørping (DK)

(73) Assignee: Bose Corporation, Framingham, MA (US)

( * ) Notice: Subject to any disclaimer, the term of this patent is extended or adjusted under 35 U.S.C. 154(b) by 157 days.

(21) Appl. No.: 17/444,793

(22) Filed: Aug. 10, 2021

(65) Prior Publication Data

US 2023/0051084 A1   Feb. 16, 2023

(51) Int. Cl.
  *H04W 28/20* (2009.01)
  *H04W 24/10* (2009.01)
  *H04W 28/02* (2009.01)
  *H04W 28/24* (2009.01)

(52) U.S. Cl.
  CPC ........... *H04W 28/20* (2013.01); *H04W 24/10* (2013.01); *H04W 28/0236* (2013.01); *H04W 28/0268* (2013.01); *H04W 28/24* (2013.01)

(58) Field of Classification Search
  None
  See application file for complete search history.

(56) References Cited

U.S. PATENT DOCUMENTS

| | | | |
|---|---|---|---|
| 10,904,310 B2 | 1/2021 | Han et al. | |
| 2016/0173805 A1* | 6/2016 | Claus | B60R 1/00 348/148 |
| 2016/0359925 A1* | 12/2016 | Song | H04L 65/1069 |
| 2017/0366596 A1* | 12/2017 | Han | H04L 1/0006 |
| 2019/0007866 A1* | 1/2019 | Agarwal | H04L 1/08 |
| 2021/0184887 A1* | 6/2021 | Balasubramaniam | H04W 28/20 |
| 2022/0263883 A1* | 8/2022 | Lee | G10L 19/24 |
| 2023/0064205 A1* | 3/2023 | Sirur | H04W 4/06 |

OTHER PUBLICATIONS

A. Derhgawen, Maximizing BLE Throughput Part 4: Everything You Need to Know, Nov. 16, 2020, PunchThrough, p. 1-14 (Year : 2020).*

* cited by examiner

*Primary Examiner* — Noel R Beharry
*Assistant Examiner* — Angelie T Ngo
(74) *Attorney, Agent, or Firm* — Bond, Schoeneck & King, PLLC

(57) ABSTRACT

Methods and systems for dynamically adjusting a data rate in a wireless connection are provided. The systems include a source device and a sink device configured to establish a wireless connection. The quality of the wireless connection is monitored. Should the quality degrade so as to satisfy a triggering event, the source controller can adjust the data rate, e.g., the bit rate or sample rate, used to reduce the number of dropped, lost, or retransmitted packets. The reduction in bit rate and/or sample rate results in packets of decreased size and additional unused air-time. The unused air-time provided can be filled with at least a portion of a frame of data originally associated with another packet. This will result in at least one packet being free to include additional retransmission packets. Additionally, should the quality of the connection improve, the source controller can adjust increase the data rate accordingly.

18 Claims, 8 Drawing Sheets

DYNAMIC TRANSMISSION RATES FOR ISOCHRONOUS STREAMING

BACKGROUND

Aspects and implementations of the present disclosure are generally directed to systems and methods for sending and receiving wireless data streams, e.g., sending and receiving wireless data streams between wireless devices.

Wireless systems, for example, wireless multi-speaker systems or systems that include a broadcasting device and a receiving device, typically utilize a fixed bit rate in the sending and receiving of data packets within the wireless connection between the devices of the system. The fixed bit rate is established during the initial set up of the connection between the two devices and remains constant as long as the connection remains active. Additionally, wireless devices can experience losses over the wireless connection, e.g., packet losses, failed transmissions, and failed retransmissions when the connection is at the edge of its link budget. For example, should the wireless devices of the system be moved away from each other, so as to increase the distance between the two devices, there will come a point where the distance between the devices will cause increased packet loss to an unacceptable degree. Similarly, in circumstances where the devices of the system are subject to other forms of environmental interference, e.g., the existence of the plurality of other wireless communications in the vicinity, the presence of an object (e.g., a user's body, or wall) between the devices that could reduce signal strength, the link budget will be strained and will eventually experience decreases in quality.

SUMMARY OF THE DISCLOSURE

The present disclosure provides methods and systems for dynamically adjusting a data rate of data in a wireless connection. In some examples, the method and system include two devices, a source device and a sink device, configured to establish a wireless connection between each other. The source device is configured to monitor the quality of the wireless connection between the two devices, and, should the quality of the connection degrade so as to trigger one or more triggering events, the source controller, in connection with a dynamic codec module and a source encoder, can adjust the data rate, e.g., the bit rate or sample rate, used for the connection to reduce the number of dropped, lost, or retransmitted packets. In some examples, the reduction in bit rate and/or sample rate results in packets of decreased size and additional unused air-time within the connection. In these examples, the unused air-time of at least one of the packets can be filled with frames of data or a portions of a frame of data originally associated with another packet. The compression of data frames provided will eventually result in at least one packet being completely free to include additional retransmission packets if needed.

At times within a Bluetooth LE Audio connection, for example, a headset or truly wireless ear buds will operate at the edge of the radio frequency (RF) range for the device. This can be caused by excessive distance between the headset and the source device, or by interference in the path between the headset and the source device. Although packet-loss-concealment (PLC) can conceal these "audio gabs," PLC cannot reconstruct lost data, hence at some packet loss rate the audio quality will no longer be acceptable.

The present disclosure sets forth methods and system to create a dynamic tradeoff between concealed audio gabs and degraded overall audio quality or audio bandwidth. For example, when the wireless connection or link begins to lose packets or retransmission at an unacceptable rate, the codec bit rate is decreased. Alternatively, as will be discussed below, the sample rate may be modified to reduce packet loss. These methods and systems benefit from decrease packet error rate due to smaller packet size, and can also provide additional frame retransmissions.

As discussed herein, in one example embodiment, the dynamic adjustment described is made based on a moving average of the number of unsuccessful transmissions. The techniques described herein may make it possible to switch from a 2MBIT Physical layer (PHY) transmission scheme to a 1MBIT PHY or even S2. Additionally, if both the source device device and the sink devices were aware that they were using one of the transmission schemes/topologies discussed below, an increased number of frames of data could be placed into each packet sent via the connection and increase the number of retransmissions.

In one example, a method of dynamically adjusting a data rate of data for a wireless connection is provided, where the method includes: establishing the wireless connection between a source device and a sink device, the wireless connection comprising an isochronous stream, the source device configured to send a plurality of data packets to the sink device at a first bitrate and a first sample rate; and in response to a triggering event, sending, from the source device to the sink device, the plurality of packets at i) a second bitrate different than the first bitrate and/or ii) a second sample rate different than the first sample rate.

In an aspect, the source device includes a controller and a dynamic codec module, the dynamic codec module configured to receive a feedback from the controller related to the wireless connection and analyze the feedback to determine if the triggering event has occurred.

In an aspect, upon a detection that the triggering event has occurred, the dynamic codec module is configured to instruct the controller to send the plurality of data packets at the second bitrate or send the plurality of data packets at the second sample rate.

In an aspect, the wireless connection includes a plurality of data packets and the triggering event is selected from at least one of: a loss of data packets above a predetermined threshold; a lowering of a link quality of the wireless connection below a predetermined threshold value; a number of successful retransmitted packets below a predetermined threshold; a number of unsuccessful retransmitted packets above a predetermined threshold; a battery level of the source device or the sink device; and a data transmission requirement.

In an aspect, the wireless connection utilizes an LE audio protocol.

In an aspect, the isochronous stream is a broadcast isochronous stream or a connected isochronous stream.

In an aspect, the second bitrate is less than the first bitrate, or wherein the second sample rate is higher than the first sample rate.

In an aspect, the wireless connection includes sending data packets within a plurality of isochronous intervals, wherein sending the plurality of data packets at the first bitrate includes sending a first data packet during a first isochronous interval and sending a second data packet during a second isochronous interval; and wherein sending the plurality of data packets at the second bitrate includes sending the first data packet during the first isochronous interval and sending at least one a portion of the second data packet during the first isochronous interval.

In an aspect, sending the plurality of data packets at the first bitrate further includes sending a third data packet during a third isochronous interval; and sending the plurality of data packets at the second bitrate includes sending the at least a portion of the third data packet within the first isochronous interval or the second isochronous interval, and sending at least one retransmission data packet during the third isochronous interval.

In an aspect, the isochronous stream is a broadcast isochronous stream and wherein the sink device is configured to send feedback from a sink controller of the sink device to a source controller of the source device related to the wireless connection and wherein a source controller of the source device is configured to analyze the feedback to determine if the triggering event has occurred.

In an aspect, upon a detection that the triggering event has occurred, a dynamic codec module of the first device is configured to instruct the source controller to send the plurality of data packets at the second bitrate or send the plurality of data packets at the second sample rate.

In another example, a source device for dynamically adjusting a data rate of data for a wireless connection is provided, the source device including a dynamic codec module and a source controller. The source controller being configured to establish the wireless connection between the source device and a sink device, the wireless connection comprising an isochronous stream, send a plurality of data packets from the source device to the sink device at a first bitrate and a first sample rate; detect, an occurrence of a triggering event based on feedback related to the wireless connection with the sink device; send the feedback to the dynamic codec module; and adjust, the data rate of data in the wireless connection by sending the plurality of packets at i) a second bitrate different than the first bitrate and/or ii) a second sample rate different than the first sample rate.

In an aspect, the triggering event is selected from at least one of: a loss of data packets above a predetermined threshold; a lowering of a link quality of the wireless connection below a predetermined threshold value; a number of successful retransmitted packets below a predetermined threshold; a number of unsuccessful retransmitted packets above a predetermined threshold; a battery level of the source device or the sink device; and a data transmission requirement.

In an aspect, the wireless connection utilizes an LE audio protocol.

In an aspect, the isochronous stream is a broadcast isochronous stream or a connected isochronous stream.

In an aspect, the second bitrate is less than the first bitrate, or wherein the second sample rate is higher than the first sample rate.

In an aspect, the source controller is configured to send data packets of the plurality of data packets within a plurality of isochronous intervals, wherein sending the plurality of data packets at the first bitrate includes sending a first data packet during a first isochronous interval and sending a second data packet during a second isochronous interval; and wherein sending the plurality of data packets at the second bitrate includes sending the first data packet during the first isochronous interval and sending at least one data frame of the second data packet during the first isochronous interval In an aspect, sending the plurality of data packets at the first bitrate further includes sending a third data packet during a third isochronous interval; and sending the plurality of data packets at the second bitrate includes sending the at least a portion of the third data packet within the first isochronous interval or the second isochronous interval, and sending at least one retransmission data packet during the third isochronous interval.

In an aspect, the isochronous stream is a broadcast isochronous stream and wherein the sink device is configured to send feedback from a sink controller of the sink device to the source controller of the source device related to the wireless connection and wherein the source controller of the source device is configured to analyze the feedback to determine if the triggering event has occurred.

In an aspect, upon detecting an occurrence of the triggering event, the dynamic codec module of the device is configured to instruct the controller to send the plurality of data packets at the second bitrate or send the plurality of data packets at the second sample rate.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides methods and systems for dynamically adjusting a data rate of data in a wireless connection. In some examples, the method and system include two devices, a source device and a sink device, configured to establish a wireless connection between each other. The source device is configured to monitor the quality of the wireless connection between the two devices, and, should the quality of the connection degrade so as to trigger one or more triggering events, the source controller, in connection with a dynamic codec module and a source encoder, can adjust the data rate, e.g., the bit rate or sample rate, used for the connection to reduce the number of dropped, lost, or retransmitted packets. In some examples, the reduction in bit rate and/or sample rate results in packets of decreased size and additional unused air-time within the connection. In these examples, the unused air-time of at least one of the packets can be filled with frames of data or a portions of a frame of data originally associated with another packet. The compression of data frames provided will eventually result in at least one packet being completely free to include additional retransmission packets if needed.

Figure 1:
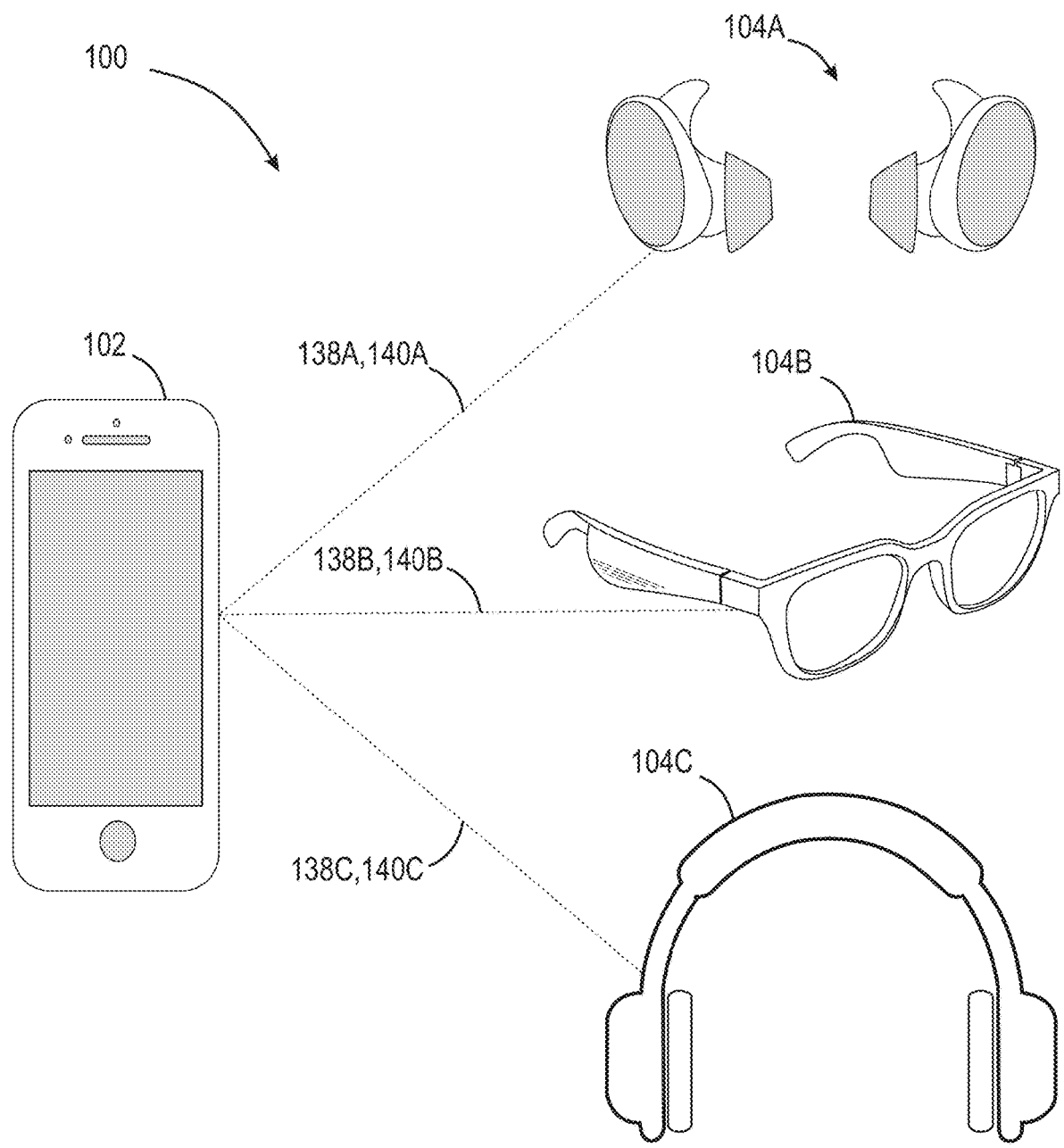
FIG. 1 is a schematic view of a system according to the present disclosure.

The term "wearable audio device", as used in this application, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows examples of an in-the-ear headphone form factor, an eyeglass form factor, and an over-the-ear headset, in other examples the wearable audio device can be an on-ear, around-ear, behind-ear, or near-ear headset. In some examples, the wearable audio device can be an open-ear device that includes an acoustic driver to radiate acoustic energy towards the ear while leaving the ear open to its environment and surroundings.

The term "connected isochronous stream" as used herein, in addition to including its ordinary meaning or its meaning known to those skilled in the art, is intended to refer to an isochronous data stream which utilizes a preestablished, point-to-point communication link over LE Audio between, e.g., a source device (which may also be known as a central or master device) and an audio device or a plurality of audio devices (which may also be known as a peripheral or slave device(s)). In other words, a connected isochronous stream can provide an isochronous audio stream which utilizes at least one established reliable communication channel and/or at least one acknowledged communication channel between the source device and any respective audio devices.

The term "broadcast isochronous stream" as used herein, in addition to including its ordinary meaning or its meaning known to those skilled in the art, is intended to refer to an isochronous data stream which does not require a preestablished communications link to be established between the source device sending data and the audio device receiving data and does not require acknowledgements or negative acknowledgements to be sent or received.

The following description should be read in view of FIGS. 1-8. FIG. 1 is a schematic view of the components of system 100 according to the present disclosure. In some examples, system 100 includes a source device 102 and at least one sink device 104. Additionally, in some examples as illustrated in FIG. 1, system 100 includes a plurality of sink devices 104A-104C (collectively referred to as "sink devices 104" or "plurality of sink devices 104"). Source device 102 is intended to be a device capable of establishing a wireless connection, e.g., wireless connection 138 (discussed below) with at least one sink device 104. Although illustrated as a smartphone, it should be appreciated that source device 102 can be selected from at least one of a tablet, a smarthub, media hub, a stereo hub, a soundbar, a headphone case, or any device capable of sending or broadcasting wireless data (discussed below) to the at least one sink device 104. Moreover, although illustrated as a pair of truly wireless earbuds 104A, an eyeglass form-factor device 104B, and an over-the-ear form-factor headset, it should be appreciated that sink devices 104 can be selected from at least one of: a smartphone, a tablet, a smarthub, media hub, a stereo hub, a soundbar, a headphone case, or any device capable of receiving wireless data (discussed below) from the source device 102. In some examples, each sink device 104 is intended to be a device capable of rendering audible acoustic energy based on the wireless data received from the source device 102, e.g., rendering audio data. In some examples, as will be discuss below, the sink devices 104 are capable of sending feedback 144 (discussed below) related to the wireless connection 138 between the source device 102 and the respective sink device 104 to dynamically adjust, alter, or change a bitrate or sample rate associated with the connection.

Figure 2:
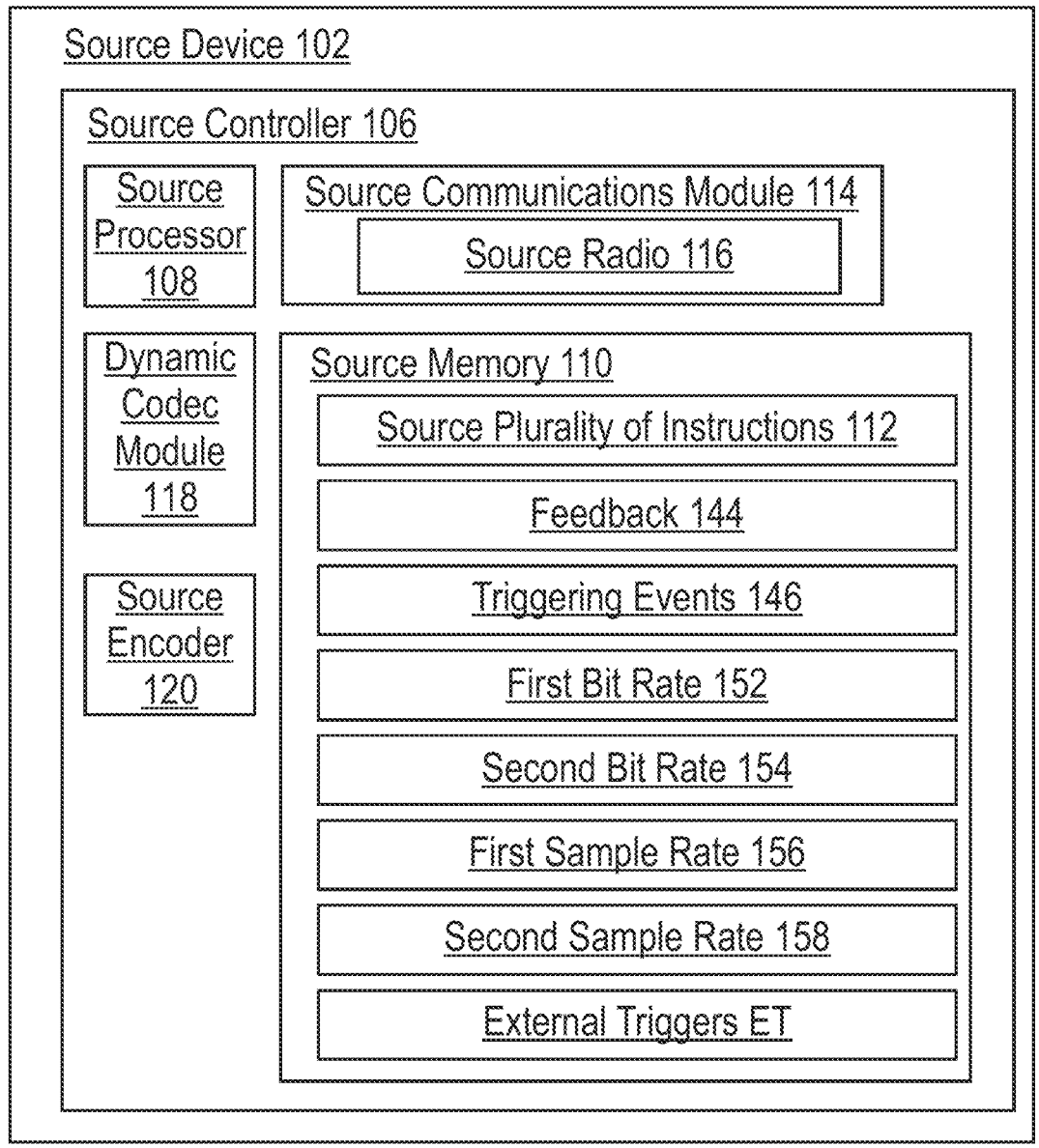
FIG. 2 is a schematic view of the components of a source device according to the present disclosure.

As illustrated schematically in FIG. 2, source device 102 includes a source controller 106 which includes a source processor 108 and a source memory 110 configured to execute and store, respectively, a plurality of non-transitory computer-readable source instructions 112, to perform the various functions of source device 102 as will be described herein. Source controller 106 also includes a source communications module 114 configured to send and/or receive wireless data, e.g., data relating to at least one of the plurality of wireless data streams discussed below, e.g., wireless connection 138. To that end, source communications module 114 can include at least one radio or antenna, e.g., source radio 116, capable of sending and receiving wireless data. In some examples, source communications module 114 can include, in addition to at least one radio (e.g., source radio 116), some form of automated gain control (AGC), a modulator and/or demodulator, and potentially a discrete processor for bit-processing that are electrically connected to source processor 108 and source memory 110 to aid in sending and/or receiving wireless data.

Additionally, source device 102 includes a dynamic codec module 118 and a source encoder 120. Dynamic codec module 118 is intended to be an algorithm or other set of instructions stored or embedded within source controller 106 or source memory 110. In some examples, dynamic codec module 118 is configured to receive feedback, e.g., feedback 144 (discussed below), from the wireless connections established between source device 102 and each sink device 104. In some examples, the dynamic codec module is arranged to dynamically adjust, change, or otherwise alter the parameters of the source encoder 120, in response to the feedback 144. In other words, the dynamic codec module 118 is configured to dynamically alter the data rate, i.e., the bitrate or the sample rate, used to encode the data being sent over the wireless connections discussed herein. As will be discussed below, source encoder 120 is configured to receive parameter information from the dynamic codec module 118 and utilize that parameter information to choose a bit rate and/or a sample rate for the data being transferred between source device 102 and each sink device 104, e.g., over wireless connection 138. In some examples, source encoder 120 is configured to utilize an audio compression codec, e.g., the LC3 audio codec, to compress audio data provided by source controller 106 so that the data can be sent to each sink device 104 wirelessly via source communications module 114. In some examples, dynamic codec module 118 and/or source encoder 120 are discrete chips or discrete combinations of processors and memory configured to execute and store, respectively, a set of non-transitory computer-readable instructions to perform the functions of dynamic codec module 118 and source encoder 120 as discussed herein.

Figure 3:
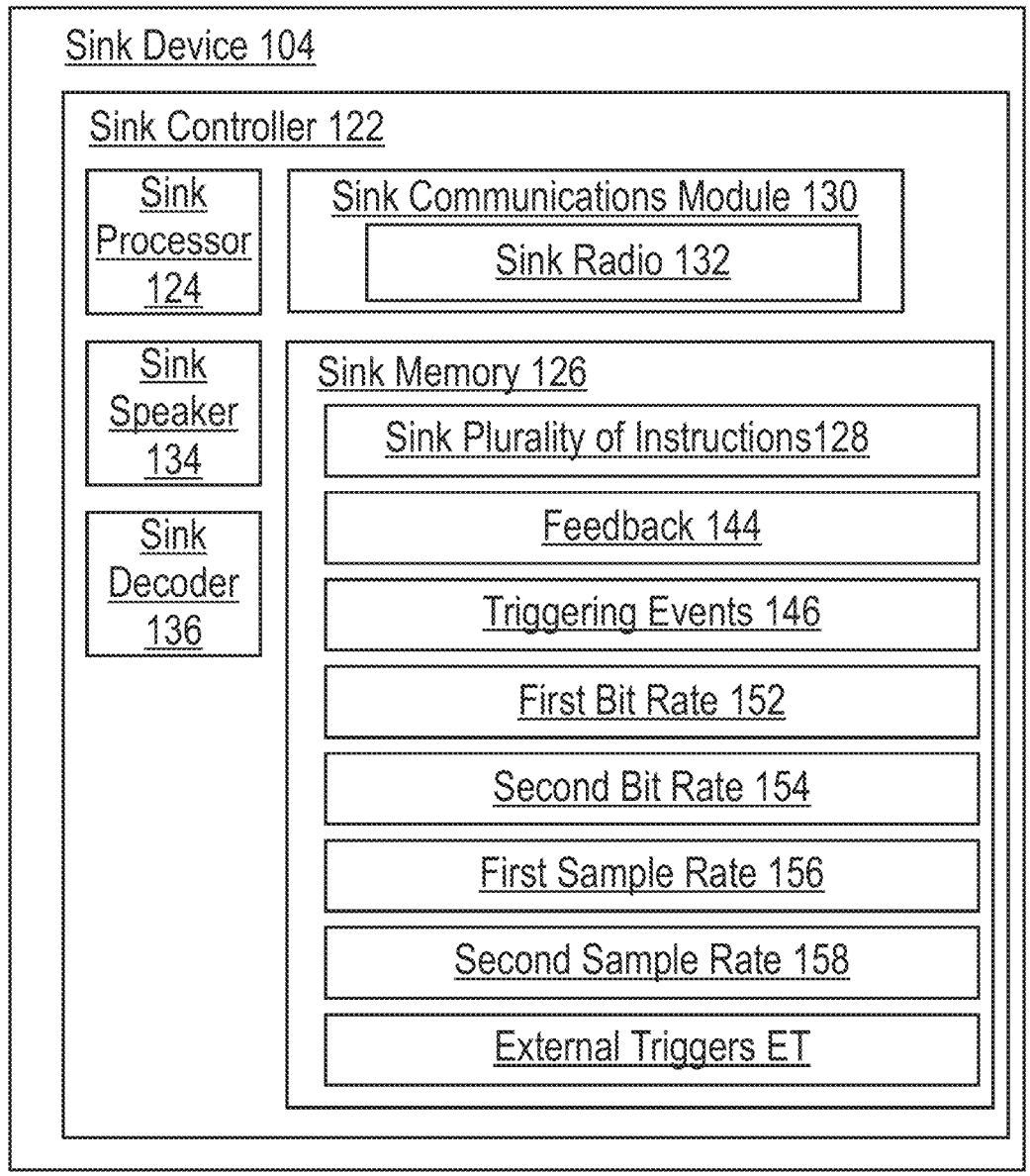
FIG. 3 is a schematic view of the components of a sink device according to the present disclosure.

As illustrated in FIG. 3, each sink device 104 can include a sink controller 122 which includes a sink processor 124 and a sink memory 126 configured to execute and store, respectively, a plurality of non-transitory computer-readable sink instructions 128, to perform the various functions of each sink device 104 as will be described herein. Each sink controller 122 also includes a sink communications module 130 configured to send and/or receive wireless data, e.g., data relating to at least one of the plurality of wireless data streams discussed below, e.g., wireless connection 138. To that end, each sink communications module 130 can include at least one radio or antenna, e.g., sink radio 132, capable of sending and receiving wireless data. In some examples, sink communications module 130 can include, in addition to at least one radio (e.g., sink radio 132), some form of automated gain control (AGC), a modulator and/or demodulator, and potentially a discrete processor for bit-processing that are electrically connected to sink processor 124 and sink memory 126 to aid in sending and/or receiving wireless data. As illustrated in FIG. 3, it should be appreciated that each sink device 104 can also include at least one speaker, i.e., sink speaker 134, which is, e.g., a loudspeaker or acoustic transducer, that is electrically connected to sink processor 124 and sink memory 126 and configured to electromechanically convert an electrical signal into audible acoustic energy within the environment surrounding each sink device, e.g., an audio playback. In some examples, the electrical signal and the audible acoustic energy are associated with the data included in the wireless connection 138 (discussed below). Furthermore, and although not illustrated, each sink controller 122 can include one or more clocks or time-keeping circuits configured to keep independent time during operation of system 100.

In some examples, as illustrated in FIG. 3, each sink device 104 also includes a sink decoder 136. Sink decoder 136 is configured to receive compressed wireless data, e.g., wireless data received from source device 102, and decompress the data such that it can be used by each sink controller 122. For example, source encoder 120 can utilize the LC3 audio codec to compress audio data so that it may be sent to each sink device 104 wirelessly via source communications module 114. The compressed data can be received by the sink communications module 130 and decompressed by sink decoder 136 such that the decompressed audio data can be utilized by each sink device 104 to render and generate audible acoustic energy via each sink speaker 134.

Each device of system 100, i.e., source device 102 and each sink device 104, can use their respective communication modules to establish one or more wireless connections 138A-138C (collectively referred to as "wireless connections 138") between the source device 102 and each sink device 104. Each wireless connection 138 can be used to send and/or receive wireless data via one or more wireless data streams 140A-140C (collectively referred to as "wireless data streams 140"). In some examples, these wireless connections 138 include establishing one or more data streams between the source device 102 and each sink device 104, where each data stream is an isochronous data stream, e.g., a connected isochronous stream using LE Audio standard. In other examples (described below), the wireless connections 138 include a broadcast isochronous stream, i.e., where source device 102 broadcasts data in one or more isochronous data streams that is/are received by one or more sink devices 104. For example, source device 102 can be configured to generate, broadcast, or otherwise wirelessly transmit a wireless data stream that is received by each sink device 104. The streams established over each wireless connection 138 can use various wireless data protocols, standards, or methods of transmission e.g., Bluetooth Low-Energy Protocols or the LE Audio standard.

Figure 4:
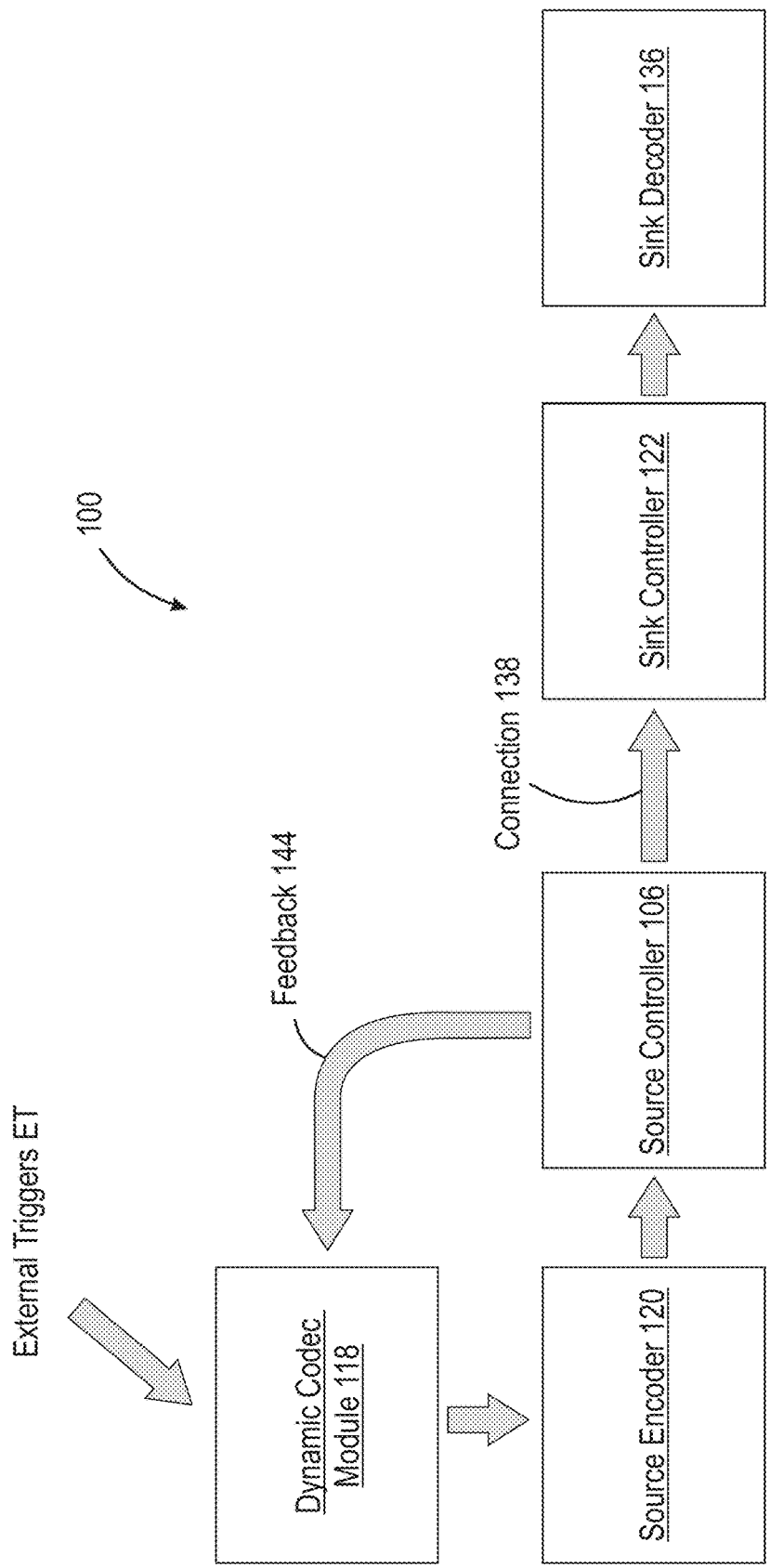
FIG. 4 is a schematic view of a system according to the present disclosure.
Figure 5:
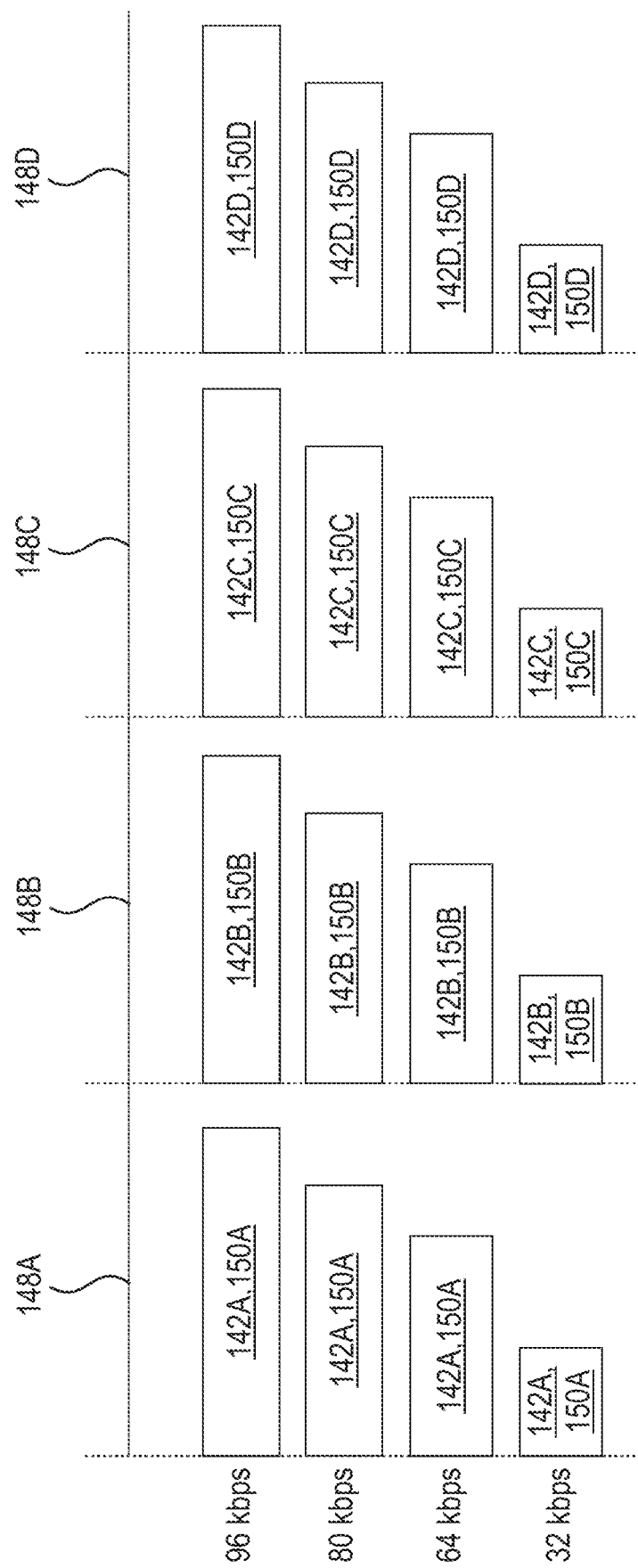
FIG. 5 is a schematic view of a plurality of packets send over a wireless connection according to the present disclosure.
Figure 6:
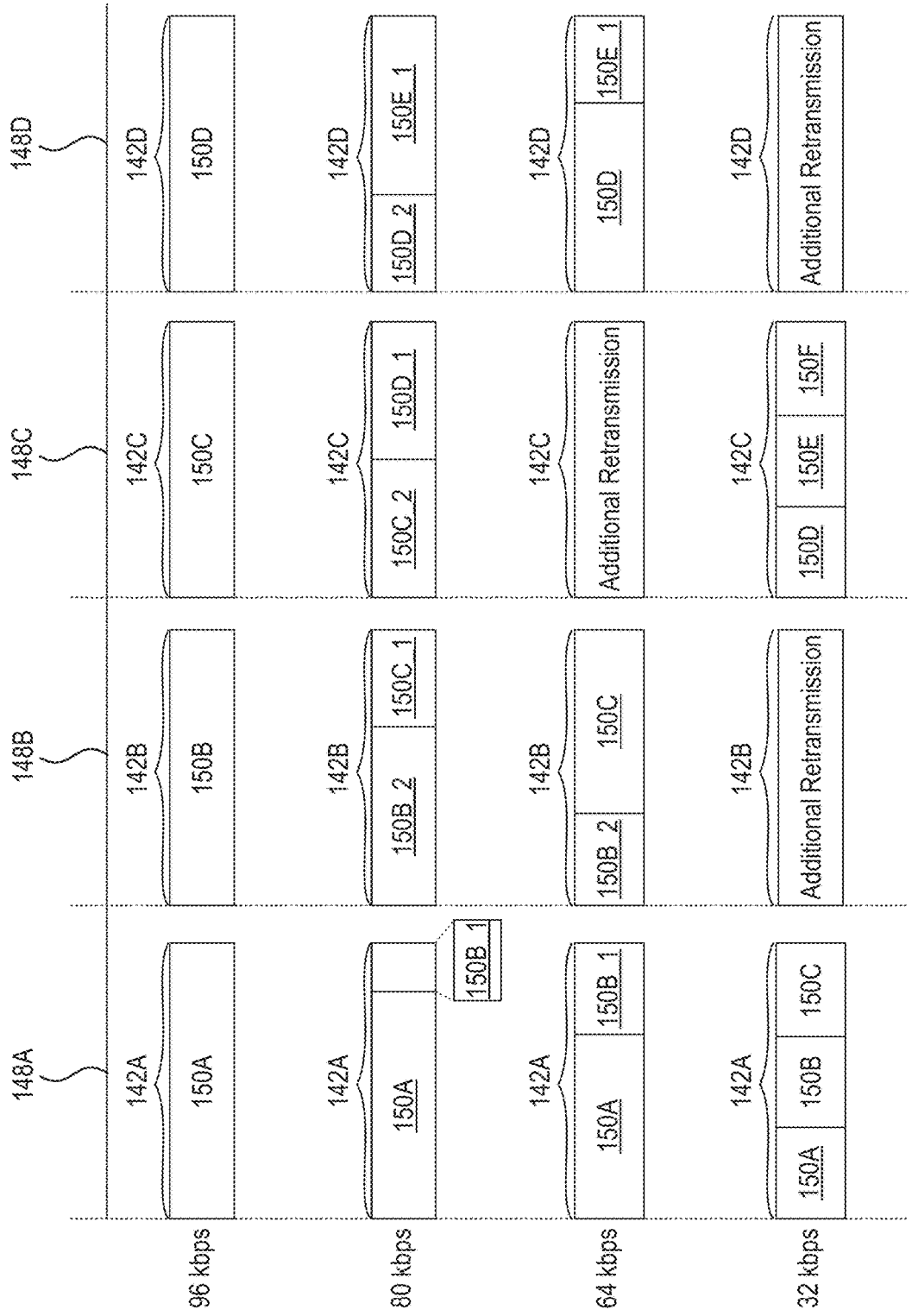
FIG. 6 is a schematic view of a plurality of packets send over a wireless connection according to the present disclosure.

Once each wireless connection 138 is negotiated and established between source device 102 and each sink device 104, the source device 102 can encode a data, e.g., audio data stored in source memory 110, using source encoder 120, and wirelessly transmit the encoded data to one or more sink device 104 over the wireless connections 138, via a plurality of data packets 142A-142D (shown in FIGS. 5-6). As schematically illustrated in FIG. 4, while transmitting the plurality of data packets 142A-142D (collectively referred to as "plurality of data packets 142" or "data packets 142"), the source controller 106 is configured to measure, gather, or otherwise obtain information or statistics on the link quality of each wireless connection 138 hereinafter referred to as feedback 144. For example, in the event each wireless connection 138 used is a connected isochronous stream, source controller 106 is configured to gather information and feedback 144 including information related to: total number of data packets 142 that have been sent; the total number of data packets 142 that were successfully received by each sink device 104; a number of lost data packets 142 for each wireless connection 138; a connection strength or RSSI value of the wireless connections 138; a number of successful retransmitted data packets; a number of unsuccessful retransmitted data packets; a battery level of source device 104 or a battery level of one or more sink devices 104; and/or a data transmission requirement of each wireless connection 138.

As will be discussed below, source controller 106 is configured to gather feedback 144 and determine whether a triggering event 146 has been met where the triggering event 146 is related to at least one of the pieces of information from the gather feedback 144 discussed above. For example, source controller 106 is configured to determine whether: the total number of data packets 142 that were successfully received by each sink device 104 falls below a predetermined threshold; a number of lost data packets 142 for each wireless connection 138 falls beneath a predetermined threshold; a connection strength or RSSI value of the wireless connections 138 falls beneath a predetermined threshold; a number of successful retransmitted data packets falls beneath a predetermined threshold; a number of unsuccessful retransmitted data packets exceeds a predetermined threshold; a battery level of source device 104 or a battery level of one or more sink devices 104 falls below a predetermined threshold; and/or a data transmission requirement of each wireless connection 138 is not being met. If one of these triggering events 146 occurs, the dynamic codec module 118 can adjust, alter, or change the bit rate of the wireless connection 138 or adjust, alter, or change the sample rate used by the codec used by the source encoder 120. In other words, the feedback 144 is analyzed by the source controller 106 and, if the feedback 144 satisfies one or more of the triggering events 146 listed above, the feedback 144 can be fed into dynamic codec module 118 which in turn can adjust or change the bitrate or sample rate used by the source encoder 120 to encode future data packets 142 with a new bitrate or sample rate to remedy or mitigate the effect of the conditions that lead to the triggering of the triggering event 146. In other examples, the source controller 106 can monitor for external triggers ET, e.g., where there is excessive traffic over a local Wi-Fi network (indicating a high likelihood of interference that would impact the link budget of the wireless connection).The external trigger ET information can be monitored and fed into the dynamic codec module 118 and can also effect or be used to alter or adjust the bit rates and sample rates discussed below.

As illustrated in FIGS. 5-6, the data packets 142 sent via each wireless connection 138 are sent via an isochronous data stream, e.g., a stream that sends data packets 142 during predetermined isochronous time intervals, e.g., isochronous intervals 148A-148D (collectively referred to as "isochronous intervals 148"). Each isochronous interval 148 can include a plurality of isochronous events and isochronous sub-events, which divide and sub-divide each Bluetooth isochronous interval based the initial negotiation of a given connection. It should be appreciated that FIGS. 5-6 each illustrate four isochronous intervals each with a single isochronous event and no sub-events such that there is only one packet 142 or protocol data unit (PDU) sent within each isochronous interval 146. Alternatively, each isochronous interval 148 can represent a sub-event within an isochronous event (e.g., a CIS event) within a larger isochronous interval. Thus, the rectangles illustrated in FIGS. 5-6 represent the total air-time taken up in sending a single packet 142 or PDU for a given data rate.

Each packet 142 or PDU can include one or more frames of data 150A-150F (collectively referred to as "frames of data 150" or "data frames 150"). Each frame of data 148 corresponds to one frame of data generated by source encoder 120. In one example, the data being sent over the wireless connections 138 discussed herein includes sending audio data or data obtained from one or more media files that contain audio data. As such, the audio data is fed into source encoder 120 and compressed using one or more audio codecs, e.g., the LC3 Audio Codec, to generate a plurality of frames of data 148. Thus, in one example, each packet 142 sent via the one or more wireless connection 138 includes a single frame of data 148. As discussed below, as the various controllers and dynamic codec module 118 operate to change or adjust the data rate used to send the data, e.g., the bit rate and/or the sample rate, one or more frames of data 148 can be sent within a single packet 142 or PDU.

Additionally, in some examples (as discussed below) the data packets 142 sent by source device 102 to one or more sink devices 104 can be framed or unframed packets. For example, framed packets can include a header and a payload whereas unframed packets do not include the packet header. In some examples, the header can include a fields for the logical transport address (LT_ADDR), a field for packet type, a field for flow control (FLOW), a field for automatic repeat request number (ARQN), a field for sequence number (SEQN), and a field for header error check (HEC), while the payload includes the encoded wireless data to be transferred from one device to the other. For example, if the data to be transferred is audio data associated with one or more audio files, the payload can include audio data in the form of one or more frames of encoded audio data. In an unframed arrangement, during the initial negotiation of the wireless connections 138, the source controller 106 and each of the sink controllers 122 can negotiate and agree on the parameters normally specified in the header of each packet so that each device knows what type of data and what parameters will be used when sending and receiving the data, rendering the inclusion of the header redundant and not necessary.

As discussed above, and shown in FIG. 5, once the one or more wireless connections 138 are established between source device 102 and each sink device 104, each connection will be established with a first bit rate 152. The first bit rate 152 can be selected from one of the known/standardized bit rates, e.g., first bit rate 152 can be selected as 96 kbps. It should be appreciated that other bit rates are possible, e.g., first bit rate 152 can be 144 kbps, 128 kbps, 96 kbps, 85,333 bps, 80 kbps, 64 kbps, 32 kbps, or 16 kbps. This first bit rate 152 is a product of sample rate of the source radio 116 and the bit depth used for each packet 142 or PDU sent. During operation of system 100, in one example, the source controller 106 is configured to obtain and monitor the feedback 144 over the wireless connections 138 to determine if one or more triggering events 146 or any external triggers ET are satisfied. Should one or more of the triggering events 146 or external triggers ET be satisfied, the source controller 106 can pass the feedback 144 to dynamic codec module 118 which in turn can use the feedback 144 to alter, adjust, or change the parameters of the wireless connection 138 to send packets 142 at a second bit rate 154, where the second bit rate 154 is different from the first bit rate 152. In some examples, the second bit rate 154 is selected from: 144 kbps, 128 kbps, 96 kbps, 85,333 bps, 80 kbps, 64 kbps, 32 kbps, or 16 kbps. For example, where the connection between source device 102 and at least one sink device 104 is at the edge of the link budget, e.g., where packet loss or failed transmission or retransmission reach unacceptable levels, a triggering event 146 will be satisfied and the dynamic codec module 118 and source encoder 120 will operate to change the first bit rate 152 (e.g., a 96 kbps bit rate) to a second bit rate 154 (e.g., 80 kbps, 64 kbps, or 32 kbps) lower than the first bit rate 152. This lowering of the bit rate from the first bit rate 152 to the second bit rate 154 can be accomplished by keeping the sample rate fixed and lowering the amount of data included in each packet. For example, by lowering the PDU size in a fixed bit-error-rate system, e.g., by reducing the number of complete audio frames of data within each PDU or packet that are capable of being lost, packet-loss-concealment systems are well equipped to conceal the loss of individual audio frames. Said another way, if the PDU or packet size is set to include only a single audio frame of data per PDU, loss of a single packet or PDU may correspond to a loss of a single audio frame, which packet-loss-concealment mechanisms are capable of successfully concealing. Conversely, loss of a single PDU or packet with a size that allows for multiple audio frames of data within a single PDU or packet will correspond to the potential loss of multiple audio frames which packet-loss-concealment mechanisms are less equipped to handle. Therefore, by lowering the PDU size or packet size and lowering the bit rate, the risk of losing complete audio frames of data is reduced. As shown in FIG. 5, as the size of the PDU is lowered by $\frac{1}{6}^{th}$ the amount of data sent in a given data frame 150, the bit rate is lowered from 96 kbps to 80 kbps. Alternatively, if the size of the PDU is reduced by 33.33% ($\frac{1}{3}^{rd}$) then the bit rate is lowered from 96 kbps to 64 kbps and if the PDU size is reduced by 66.66% ($\frac{2}{3}^{rd}$) then the bit rate is lowered from 96 to 32 kbps.

Similarly, once the wireless connections 138 are established between source device 102 and each sink device 104 each connection will be established with a first sample rate 156. The first sample rate 156 can be selected from one of the known/standardized sample rates for Bluetooth compatible devices, e.g., 8 kHz, 16 kHz, 24 kHz, 32 kHz, 48 kHz, 64 kHz, 96 kHz, 120 kHz, 124 kHz, 144 kHz, etc. Should one or more of the triggering events 146 or external triggers ET be satisfied, the source controller 106 can pass the feedback 144 to dynamic codec module 118 which in turn can be used the feedback 144 to alter, adjust, or change the parameters of the wireless connection 138 to send packets 142 at a second sample rate 158, where the second sample rate 158 is different from the first sample rate 156. For example, where the connection between source device 102 and at least one sink device 104 is at the edge of the link budget, e.g., where packet loss or failed transmission or retransmission reach unacceptable levels, a triggering event 146 will be satisfied and the dynamic codec module 118 and source encoder 120 will operate to change the first sample rate 156 (e.g., a 48 kHz sample rate) to a second sample rate 158 lower than the first sample rate 156 (e.g., an 32 kHz sample rate). For example, if the data being transmitted was audio data and the sink device 104 was an audio playback device, e.g., a pair of truly wireless earbuds, this lowering of the sample rate from 48 kHz to 32 kHz is so insignificant that the user would likely not be able to distinguish the difference is audio quality, but the audio bandwidth will be reduced from 22.5 kHz to 16 kHz and therefor lower bit rate and lower lost packets with a fixed bit-error-rate.

In another example, in addition to reducing the PDU size for each packet 142, the controllers of the source device 102 and sink devices 104 can utilize the freed air-space previously occupied by the larger PDU size to transmit at least a portion of the data contained in the frame or frames of data 150 originally sent with other packets during a given packet's air-time. For example, as shown in FIG. 6, at first bit rate 152 (e.g., at 96 kbps), there is no excess air-time within a given packet 142. If packet size or PDU size is decreased, e.g., by $\frac{1}{6}^{th}$, the second bit rate 154 will be reduced to a bit rate of 80 kbps. By reducing the packet size by $116^{th}$, the air-time previously used by that data is not free air-space. As discussed above, by reducing the packet size in a fixed bit-error-rate system, less packet loss will occur. In the 80 kbps example set forth herein and illustrated in FIG. 6, at the second bit rate 154, the system 100 is configured to send a complete frame or frame of data 150A within the reduced size of the first packet 142A and during the first isochronous interval 148A, and the freed air-space previously occupied by the first frame of data 150A is now allocated to at least a portion of the data or frame of data 150B that was previously sent within the second packet 142B during the second isochronous interval 148B. In other words, the second frame 150B is split into two sub-frames 150B_1 and 150B_2, where 150B_1 is sent during the freed air space remaining in first packet 142A and 150B_2 is the remaining data of the second frame 152B that was not a part of 150B_1 and is sent within the second packet 142B during the second isochronous interval 148B. Further data frames 150 can be divided as necessary to ensure that the original air-time taken up by each packet 142 while using the first bit rate 152 is filled in by at least a portion of the next data frame 150 during each isochronous interval 148. For example, now that a portion of the second frame 150B is sent during the first isochronous interval 148A, the additional air-time afforded by the smaller PDU size for the second packet 142B and the reduced size of the remaining portion of second frame 150B (e.g., 150B_2) there is even more air-time available for a portion of the third frame 150C_1 to be sent during the available air time of the second isochronous interval 148B. As such, third frame 150C can be sub-divided into two sections 150C_1 and 150C_2, where 150C_1 is sent during the air-time of second packet 142B and the remaining portion of third frame 150C, i.e., frame 150C_2 is sent during the third isochronous interval 148C. This pattern can continue through sub-divisions of frames 150D and 150E until the condensing and sharing of air time will result in a complete isochronous interval being free of any packets. For example, after five full isochronous streams at 80 kbps, there will be an empty isochronous interval that can be used to send additional retransmissions between the source device 102 and the sink devices 104, if needed. It should be noted that in a reduction from a bit rate of 96 kbps to 80 kbps, several of the frames of data, e.g., 150A-150D, are split between two PDUs or packets 142. As such, this configuration would require the receipt of both PDUs to successfully decode a given frame of data 150.

In an alternative example, also shown in FIG. 6, where the second bit rate 154 is reduced to 64 kbps, i.e., by $\frac{1}{3}^{rd}$ of the first bit rate 152, the air-time used by three packets 142A-142C using the first bit rate 152, can now be separated and condensed into three packets by splitting the second frame 150B in half, i.e., into frame 150B_1 and frame 150B_2 and sending frame 150B_1 during the freed air-time following the first frame 150A and sending frame 150B_2 during the first portion of the second packet 142B. This frees up the third isochronous interval to allow for additional retransmissions of any data included in the first three frames 150A-150C during the third isochronous interval 148C. This pattern can repeat so that every third isochronous interval has free air-time for sending additional retransmissions between source device 102 and sink devices 104.

Similarly, where the second bit rate 154 is reduced to 32 kbps, i.e., by $\frac{2}{3}^{rd}$ of the first bit rate 152, the air-time used by first packet 142A using the first bit rate 152, can now be utilized to send three frames of data 150A-150C This frees up the air-time originally associated with the second packet 142B to allow for additional retransmissions of any data included in the first three frames 150A-150C during the second isochronous interval 148B. This pattern can repeat so that every other isochronous interval has free air-time for sending additional retransmissions between source device 102 and sink devices 104.

As illustrated by the Table A below, which illustrates non-limiting, non-exhaustive, examples of dynamic bit rate selection, it should be appreciated that dynamic selection of PDU or packet size along with dynamic selection of bit rate and sample rate can be used together to achieve various suitable ratios of frames per packet.

TABLE A

| Paramter | Low | Medium | High | PDU size |
|---|---|---|---|---|
| Sample Rate | 32 kHz | 48 kHz | 48 kHz | |
| Bit Rate | 72 kbps | 96 kbps | 144 kbps | 180 octets |
| Frames/Packet | 2 | 1.5 | 1 | |

As shown above, in a low quality scheme, source controller 106, along with dynamic codec module 118 and source encoder 120 can use the LE Audio standard and the LC3 audio codec with 10 ms frames, to establish a wireless connection 138 with a sample rate of 32 kHz and a bit rate of 72 kpbs and a PDU size of 180 octets would result in two complete frames of data being sendable in a single packet air-time. This means that every other packet could be utilized for additional retransmissions, if needed. In a medium quality scheme the wireless connection 138 is established with a sample rate of 48 kHz and a bit rate of 96 kpbs and a PDU size of 180 octets would result in one and a half frames of data being sendable in a single packet air-time. This means that after two complete packets this scheme would allow for a complete packet for any additional retransmissions, if needed. In a high quality scheme the wireless connection 138 is established with a sample rate of 48 kHz and a bit rate of 144 kpbs and a PDU size of 180 octets would result in one complete frame of data being sent in a single packet air-time. This means that no additional packets will be available for additional retransmissions.

Additionally, as shown in Tables B and C below (which illustrate additional non-limiting and non-exhaustive examples of potential bit rate and sample rate ratios), by changing the PDU size further along with the bit rate and sample rates discussed above, other potential combinations and options for the topologies discussed above can be realized.

TABLE B

| Paramter | Low | Medium | High | PDU size |
|---|---|---|---|---|
| Sample Rate | 32 kHz | 48 kHz | 48 kHz | |
| Bit Rate | 64 kbps | 85,333 bps | 128 kbps | 160 octets |
| Frames/Packet | 2 | 1.5 | 1 | |

As shown in Table B above, by reducing the PDU size to 160 octets, and keeping the sample rates the same between the low, medium, and high quality schemes, the bit rate is reduced to 64 kbps, 85,333 bps, and 128 kbps, respectively. This maintains the frames per packet ratios discussed above for the low, medium, and high quality schemes.

TABLE C

| Paramter | Low | Medium | PDU size |
|---|---|---|---|
| Sample Rate | 32 kHz | 48 kHz | |
| Bit Rate | 64 kbps | 85,333 bps | 120 octets |
| Frames/Packet | 1.5 | 1 | |

As shown in Table C above, by reducing the PDU size to 120 octets, and keeping the sample rates the same between the low and medium quality schemes, the bit rate is reduced to 64 kbps and 96 kbps, respectively. Additionally, this reduction results in a one and a half frames of data being sendable in a single packet air-time for the low quality scheme and one complete frame of data being sendable for the medium quality scheme. This means that after two complete packets the low quality scheme would allow for a complete packet for any additional retransmissions, if needed, and after one complete packets, the medium quality scheme would allow for a complete packet for any additional retransmissions, if needed.

In one operational example, a source device 102 is configured to establish a first wireless connection 138A with a sink device 104A that utilizes the LE Audio standard. Using the dynamic codec module 118 and the source encoder 120 running the LC3 Audio codec, the established connection has an initial bit rate, i.e., first bit rate 152 (e.g., 96 kbps). Source controller 106 of source device 102 is configured to monitor the wireless connection 138A and determine from feedback 144 whether at least one of the triggering events 146 (discussed above) has occurred. Once source controller 106 determines that a triggering event 146 or external trigger ET has occurred, source controller 106 can provide the feedback 144 to the dynamic codec module 118 and/or to the source encoder 120 to dynamically adjust, alter, or change the bit rate used for the wireless connection 138A, e.g., by changing the bit rate for future packets from first bit rate 152 to a second bit rate 154, where the second bit rate 154 (e.g., 64 kbps) is different than the first bit rate 152. This reduction in bit rate is caused by a reduction in the size of the packets 142 sent over the wireless connection 138A, e.g., by reducing the packet or PDU size by 33%. This reduction in PDU size will translate into a proportional reduction in the bit rate, resulting in less dropped or lost packets in a fixed bit-error-rate system.

In another example operation of system 100, a source device 102 is configured to establish a first wireless connection 138A with a sink device 104A that utilizes the LE Audio standard. Using the dynamic codec module 118 and the source encoder 120 running the LC3 Audio codec, the established connection has an initial sample rate, i.e., first sample rate 156 (e.g., 48 kHz). Source controller 106 of source device 102 is configured to monitor the wireless connection 138A and determine from feedback 144 whether at least one of the triggering events 146 (discussed above) has occurred. Once source controller 106 determines that a triggering event 146 or external trigger ET has occurred, source controller 106 can provide the feedback 144 to the dynamic codec module 118 and/or to the source encoder 120 to dynamically adjust, alter, or change the sample rate used for the wireless connection 138A, e.g., by changing the sample rate for future packets from first sample rate 156 to a second sample rate 158 (e.g., 32 kHz), where the second sample rate 158 is different than the first sample rate 156. This reduction in sample rate from 48 kHz to 32 kHz will reduce the audio bandwidth from 22.5 kHz to 16 kHz and therefor lower bit rate and lower the amount of lost packets with a fixed bit-error-rate system.

In a further example operation of system 100, a source device 102 is configured to establish a first wireless connection 138A with a sink device 104A that utilizes the LE Audio standard. Using the dynamic codec module 118 and the source encoder 120 running the LC3 Audio codec, the established connection has an bit rate, i.e., first bit rate 152 (e.g., 96 kbps). Source controller 106 of source device 102 is configured to monitor the wireless connection 138A and determine from feedback 144 whether at least one of the triggering events 146 (discussed above) has occurred. Once source controller 106 determines that a triggering event 146 or external trigger ET has occurred, source controller 106 can provide the feedback 144 to the dynamic codec module 118 and/or to the source encoder 120 to dynamically adjust, alter, or change the bit rate used for the wireless connection 138A, e.g., by changing the bit rate for future packets from first bit rate 152 to a second bit rate 154, where the second bit rate 154 (e.g., 64 kbps) is different than the first bit rate 152. This reduction in bit rate is caused by a reduction in the size of the packets 142 sent over the wireless connection 138A, e.g., by reducing the packet or PDU size by 33%. This reduction in PDU size will free up additional air-time within the first isochronous interval 148A which was previously used to send packet 142A at the first bit rate 152. The source controller 106, along with the dynamic codec module 118 and source encoder 120, can utilize the extra air-time to send at least a portion of a frame of data that would have been sent exclusively in the second isochronous interval 148B using the first bit rate 152. In other words, when using the second bit rate 154, at least a portion of a frame of data that would have been sent during the second isochronous interval 148B is sent during the newly available air-time afforded by the smaller PDU size in the first isochronous interval 148A. For example, as shown in FIG. 6, at the second bit rate 154 (e.g., 64 kbps), the packet size or PDU size of first packet 142A is reduced by 33% compared to the size of first packet 142A using the first bit rate 152 (e.g., 96 kbps). Thus, using the second bit rate 154, an entire frame, e.g., first frame of data 150A, can be sent completely within the first packet 142A. The additional 33% air-time that used to be used with a 96 kbps bit rate, i.e., first bit rate 152 can be used by at least a portion of a frame that would have been send exclusively during the second 142B during the second isochronous interval 148B, e.g., part of second frame 150B can be sent in the open air-time of first packet 142A. To achieve this, second frame 150B can be split into two sub-frames, e.g., first sub-frame 150B_1 and second sub-frame 150B_2, where the first and second sub-frames contain substantially equal amount of data. Additionally, as shown, the entire third frame 150C can be sent within the remaining air-time of the second packet 142B during the second isochronous interval 148B. This compression caused by the reduction in PDU size and frame sharing between packets that can include more data than is contained in each frame will result in every third isochronous interval including an entire packet that can be dedicated to additional retransmissions if needed, thus increasing the robustness of the transmission topology. It should be appreciated that the transmission scheme set forth above, can utilize framed or unframed packets. For example, in the framed example each packet can include a header that includes information about the type of data being sent, the sample rate, the bit rate, etc. The header data can then be used by the sink controller 122 when decoding the packets received. Alternatively, as the example above utilizes the LC3 audio codec and LE Audio communication standard, both controllers (source and sink) will know that the type of data is audio data and therefore, the headers are not needed. Thus, an unframed scheme may be employed in the alternative.

Figure 7:
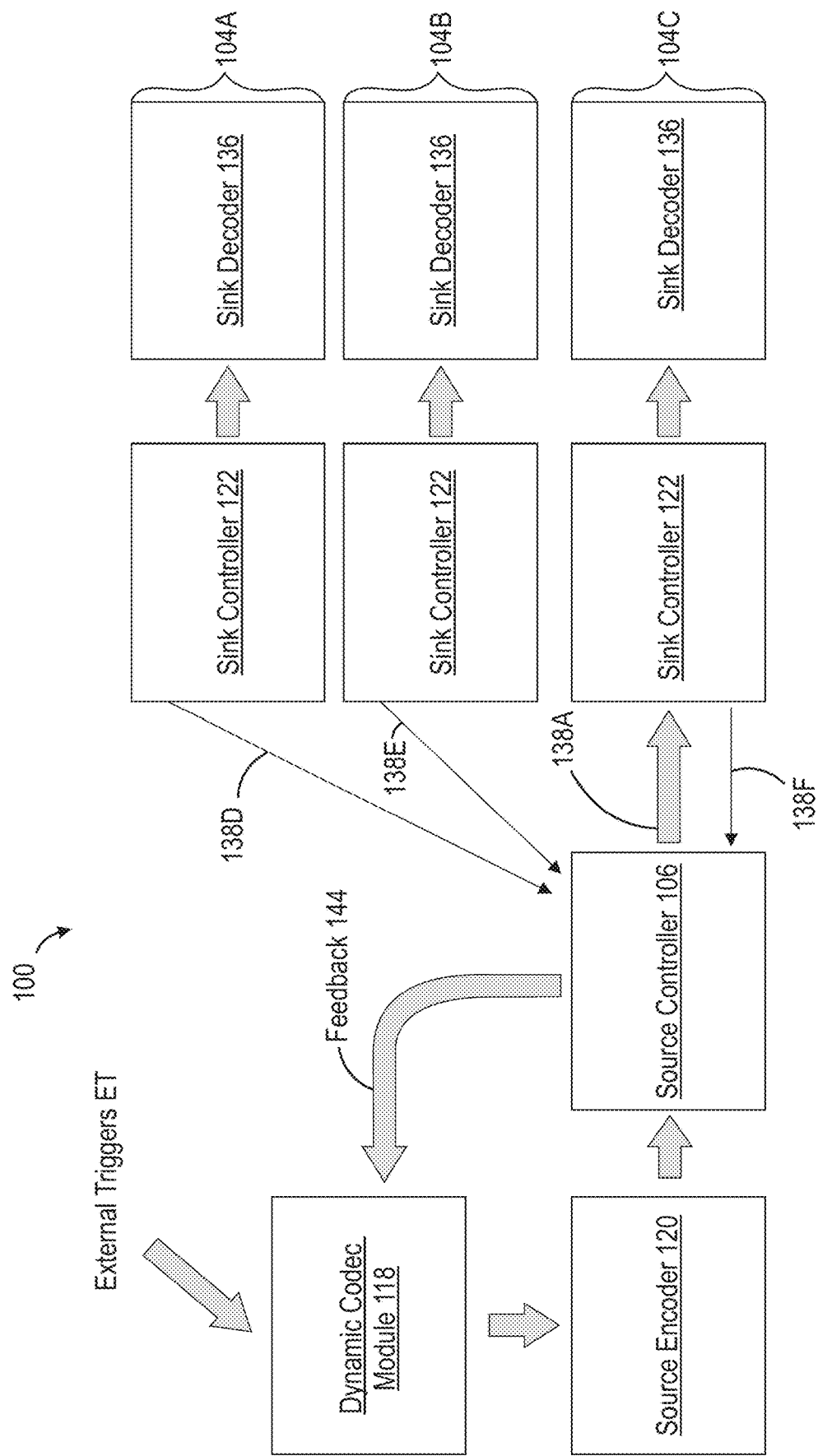
FIG. 7 is a schematic view of a system according to the present disclosure.

Additionally, as illustrated in FIG. 7, the transmission scheme/topology discussed above can be utilized where the wireless connections 138 are replaced by a connection that utilizes a broadcast isochronous stream rather than a connected isochronous stream. As illustrated, wireless connection 138 is shown as a broadcast isochronous stream. In a broadcast isochronous stream example, the source controller 106 is not typically configured to receive any feedback 144 from the wireless connection 138. However, as proposed here, the present disclosure provides that each sink device 104 is configured to gather, monitor, or otherwise obtain link information regarding the broadcast isochronous stream being broadcast by source controller 106, and are configured to send feedback 144 to source controller 106 via a separate connection or channel, e.g., via a Asynchronous Connection-Less (ACL) communication protocol. Thus, both the source device 102 and the sink device 104 need to be aware of this connection scheme and be aware that feedback 144 is being gathered and sent back to the source controller 106 via this additional connection or channel. Thus, in the broadcast isochronous stream example illustrated, the source controller 106 is configured to receive feedback 144 from wireless connections 138D-138F each associated with the respective sink devices 104A-104C. Once the source controller 106 receives the feedback 144 from each sink device 104, should the connection to one or more sink device 104 satisfy one or more triggering events 146, the source controller 106, in conjunction with dynamic codec module 118 and source encoder 120 can dynamically adjust, the PDU size, the bit rate or the sample rate, originally used when establishing the broadcast isochronous stream to a second PDU size, second bit rate, or second sample rate to reduce the amount of lost packets and/or allow for additional air-time to send additional retransmissions as discussed above.

Although the foregoing description provides multiple examples of adjustments in bit rate, sample rate, or PDU size that ultimately result in a decrease in bit rate in response to a triggering event that indicates a reduction in link quality, it should be appreciated that the described change or adjustment from the first bit rate or first sample rate to the second bit rate or second sample rate can also refer to an increase in bit rate from the first bit rate 152 to the second bit rate 154 and an increase in bit rate from the first sample rate 156 to the second sample rate 158. For example, in the event one or more triggering events 146 and/or external triggers ET (indicating a lower quality link quality between the source device 102 and the sink device 104) are satisfied, the foregoing examples can be used to lower the effective bit rate of a given connection from the first bit rate 152 to second bit rate 154. Conversely, once the bit rate is lowered, it is contemplated by the present disclosure that the link quality can improve, and the foregoing examples with respect to adjusting the bit rate can apply in response to a triggering event 146 or external trigger ET that indicates the link quality has improved and would result in a change from a first bit rate 154 to a second bit rate 156 that corresponds to an increase in the bit rate of the wireless connection 138A between the source device 102 and the sink device 104. Similarly, upon detection of a triggering event or external trigger the adjustment from the first sample rate 156 to the second sample rate 158 would result in an increase in the overall bit rate of the wireless connection 138A. As such, detection of triggering events 146 and external triggers ET can include detection of at least one of the following: the total number of data packets 142 that were successfully received by each sink device 104 rises above a predetermined threshold; a number of lost data packets 142 for each wireless connection 138 rises above a predetermined threshold; a connection strength or RSSI value of the wireless connections 138 rises above a predetermined threshold; a number of successful retransmitted data packets rises above a predetermined threshold; a number of unsuccessful retransmitted data packets falls below a predetermined threshold; a battery level of source device 104 or a battery level of one or more sink devices 104 rises above a predetermined threshold; and/or a data transmission requirement of each wireless connection 138 is being met. Additionally external triggers ET can be monitored and used as a triggering event, e.g., where there is a decreased amount of traffic over a local Wi-Fi network (indicating a low likelihood of interference that would impact the link budget of the wireless connection).

Figure 8:
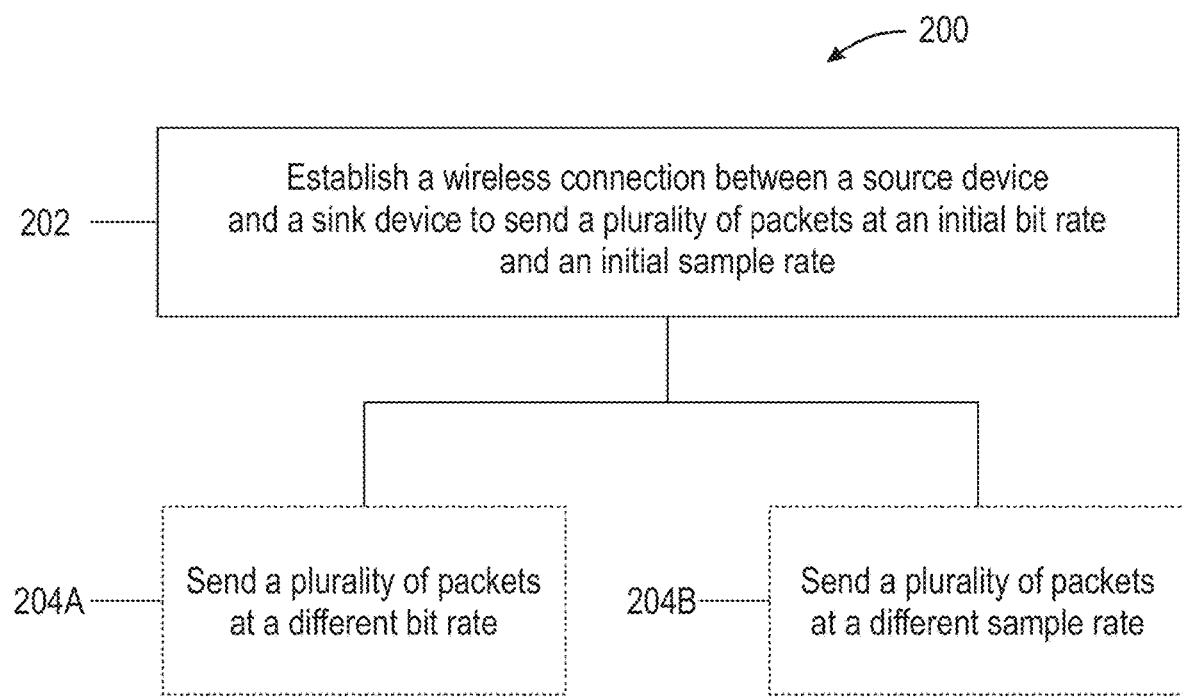
FIG. 8 is flow chart illustrating exemplary steps of a method according to the present disclosure.

FIG. 8 illustrates exemplary steps of a method 200 according to the present disclosure. Method 200 includes, for example: establishing the wireless connection 138A between a source device 102 and a sink device 104, the wireless connection 138 comprising an isochronous stream, the source device 102 configured to send a plurality of data packets 142 to the sink device 104 at first bitrate 152 and a first sample rate 156 (step 202); and, in response to a triggering event 146, sending, from the source device 102 to the sink device 104, the plurality of data packets 142 at i) a second bitrate 154 different than the first bitrate 152 (step 204A) and/or ii) a second sample rate 158 different than the first sample rate 156 (step 204B). In some examples, as discussed above, the adjustment of the sample rate from the first sample rate 156 to the second sample rate 158 includes a reduction in sample rate which implies a reduction in bit rate as well.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of dynamically adjusting a data rate of data for a wireless connection, comprising:
    establishing the wireless connection between a source device and a sink device, the wireless connection comprising an isochronous stream, the source device configured to send a plurality of data packets to the sink device at a first bitrate; and
    in response to a triggering event, sending, from the source device to the sink device, the plurality of data packets at a second bitrate different from the first bitrate;
    wherein the wireless connection includes sending data packets within a plurality of isochronous intervals, wherein sending the plurality of data packets at the first bitrate includes sending a first data packet during a first isochronous interval and sending a second data packet during a second isochronous interval; and
    wherein sending the plurality of data packets at the second bitrate includes sending the first data packet during the first isochronous interval, sending a first portion of the second data packet during the first isochronous interval, and sending a second portion of the second data packet during the second isochronous interval;
    wherein sending the plurality of data packets at the first bitrate further includes sending a third data packet during a third isochronous interval; and
    wherein sending the plurality of data packets at the second bitrate further includes sending the at least a portion of the third data packet within the first isochronous interval or the second isochronous interval, and sending at least one retransmission data packet during the third isochronous interval.

2. The method of claim 1, wherein the source device includes a controller and a dynamic codec module, the dynamic codec module configured to receive a feedback from the controller related to the wireless connection and analyze the feedback to determine if the triggering event has occurred.

3. The method of claim 2, wherein upon a detection that the triggering event has occurred, the dynamic codec module is configured to instruct the controller to send the plurality of data packets at the second bitrate.

4. The method of claim 1, wherein the wireless connection includes a plurality of data packets and the triggering event is selected from at least one of: a loss of data packets above a predetermined threshold; a lowering of a link quality of the wireless connection below a predetermined threshold value; a number of successful retransmitted packets below a predetermined threshold; a number of unsuccessful retransmitted packets above a predetermined threshold; a battery level of the source device or the sink device;
and a data transmission requirement.

5. The method of claim 1, wherein the wireless connection utilizes a Bluetooth Low Energy (LE) Audio standard.

6. The method of claim 1, wherein the isochronous stream is a broadcast isochronous stream or a connected isochronous stream.

7. The method of claim 1, wherein the second bitrate is less than the first bitrate.

8. The method of claim 1, wherein the isochronous stream is a broadcast isochronous stream and wherein the sink device is configured to send feedback from a sink controller of the sink device to a source controller of the source device related to the wireless connection and wherein a source controller of the source device is configured to analyze the feedback to determine if the triggering event has occurred.

9. The method of claim 8, wherein upon a detection that the triggering event has occurred, a dynamic codec module of the first device is configured to instruct the source controller to send the plurality of data packets at the second bitrate.

10. A source device for dynamically adjusting a data rate of data for a wireless connection, the source device comprising:
a dynamic codec module; and
a source controller for establishing the wireless connection between the source device and a sink device, the wireless connection comprising an isochronous stream, the source controller configured to:
send a plurality of data packets from the source device to the sink device at a first bitrate;
detect, an occurrence of a triggering event based on feedback related to the wireless connection with the sink device;
send the feedback to the dynamic codec module; and
adjust, the data rate of data in the wireless connection by sending the plurality of data packets at a second bitrate different than the first bitrate;
wherein the source controller is further configured to send the plurality of data packets of the plurality of data packets within a plurality of isochronous intervals, wherein sending the plurality of data packets at the first bitrate includes sending a first data packet during a first isochronous interval and sending a second data packet during a second isochronous interval; and
wherein sending the plurality of data packets at the second bitrate includes sending the first data packet during the first isochronous interval, sending at a first data frame of the second data packet during the first isochronous interval, and sending at a second data frame of the second data packet during the second isochronous interval;
wherein sending the plurality of data packets at the first bitrate further includes sending a third data packet during a third isochronous interval; and
wherein sending the plurality of data packets at the second bitrate further includes sending the at least a portion of the third data packet within the first isochronous interval or the second isochronous interval, and sending at least one retransmission data packet during the third isochronous interval.

11. The source device of claim 10, wherein the triggering event is selected from at least one of: a loss of data packets above a predetermined threshold; a lowering of a link quality of the wireless connection below a predetermined threshold value; a number of successful retransmitted packets below a predetermined threshold; a number of unsuccessful retransmitted packets above a predetermined threshold; a battery level of the source device or the sink device; and a data transmission requirement.

12. The source device of claim 10, wherein the wireless connection utilizes a Bluetooth Low Energy (LE) Audio standard.

13. The source device of claim 10, wherein the isochronous stream is a broadcast isochronous stream or a connected isochronous stream.

14. The source device of claim 10, wherein the second bitrate is less than the first bitrate.

15. The source device of claim 10, wherein the isochronous stream is a broadcast isochronous stream and wherein the sink device is configured to send feedback from a sink controller of the sink device to the source controller of the source device related to the wireless connection and wherein the source controller of the source device is configured to analyze the feedback to determine if the triggering event has occurred.

16. The source device of claim 15, wherein upon detecting the occurrence of the triggering event, the dynamic codec module of the device is configured to instruct the controller to send the plurality of data packets at the second bitrate.

17. The method of claim 1, wherein the first data packet, the second data packet, the third data packet, and the at least one retransmission data packet are transmitted consecutively.

18. The source device of claim 10, wherein the first data packet, the second data packet, the third data packet, and the at least one retransmission data packet are transmitted consecutively.

* * * * *